Patented Mar. 22, 1932

1,850,136

UNITED STATES PATENT OFFICE

DONALD H. POWERS, OF PENNSGROVE, NEW JERSEY, ASSIGNOR TO E. I. DU PONT DE NEMOURS & COMPANY, OF WILMINGTON, DELAWARE, A CORPORATION OF DELAWARE

ACCELERATOR COMPOUND AND PROCESS OF PREPARING SAME

No Drawing. Application filed October 9, 1926. Serial No. 140,693.

This invention relates to a new class of products and to the process of preparing the same. More specifically, it relates to a class of compounds resulting from the interaction of an aldehyde, a primary amine and carbon disulphide.

The invention has as its primary object the production of novel compounds of valuable characteristics. In particular, it is the object of the invention to produce compounds especially adapted to accelerate the vulcanization of rubber and which will, when employed as accelerators, reduce the time required for satisfactory vulcanization, and yield a rubber product of superior quality and durability.

This application is in the nature of a continuation, in part, of my application Serial No. 34,732, filed June 3, 1925, Patent 1,732,532 dated October 22, 1929 which covers products resulting from the interaction of an aldehyde, a primary amine, and carbon disulphide and the employment of these products as vulcanization accelerators.

I have now discovered that if the carbon bisulphide is caused to react with the amine first and the resulting product then caused to react with the aldehyde, that products particularly valuable for use as accelerators are obtained. Also, I have discovered that those aldehydes containing a plurality of carbon atoms are best adapted for the production of accelerators of this type and that, if certain ratios of the three components, which ratios were not specifically disclosed in the previous application, are employed, products of very unusual activity as accelerating agents result. Particularly, I have discovered that the use of two, three, four or even five moles of an aldehyde with one mole of amine gives compounds of remarkable activity. The amines and aldehydes used may be either aliphatic or aromatic, although in the preferred embodiments of my invention I employ aliphatic aldehydes. The compounds resulting are of indefinite composition.

When the amine and the $CS_2$ are mixed the addition compound, a dithio carbamate, is formed:

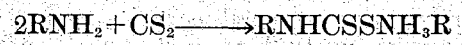

This dithio carbamate is heated under pressure with two or more moles of an aldehyde to give, most probably, a condensation product with the elimination of water.

The preparation of the new accelerators may be best disclosed by the presentation of a number of examples embodying the invention. It is to be understood that these examples are purely illustrative and that the conditions, reagents and proportions therein specified are susceptible of variation. The examples follow:

*Example 1.*—To two hundred and fifteen pounds of melted paratoluidine, one hundred pounds of carbon bisulphide is slowly added under a reflux condenser. Four hundred and fifty pounds of butyraldehyde is slowly added and the product heated under pressure for three hours at 130° C. The water is separated and the product dried in vacuum. In a stock of one hundred parts of smoked sheet, three parts of zinc oxide, three and a half parts of sulphur, and 0.375 parts of accelerator, a good cure was obtained in thirty minutes at twenty-five pounds steam pressure. The quantities employed in this example correspond to 3.1 moles of aldehyde, 1 mole of amine and .66 mole of carbon bisulphide.

*Example 2.*—To two hundred pounds of aniline are slowly added one hundred pounds of carbon bisulfide. The product is cooled and mixed until the reaction is complete. One thousand pounds of heptaldehyde are then added below the surface, cooling the mixture during the addition. The resulting product is heated under pressure at 125° C. for three hours. The resulting compound is purified by distilling off any unreacted volatile materials under vacuum. This product, when tested in a percentage of 0.5, in a stock containing one hundred parts of smoked sheet, five parts of zinc oxide, and three parts of sulphur, gave a good cure in thirty minutes at twenty-five pounds steam pressure. The quantities employed in this example correspond to 4.1 moles of aldehyde, 1 mole of amine and .61 mole of carbon bisulphide.

*Example 3.*—One hundred pounds of carbon bisulphide are slowly added, under reflux, to one hundred fifty pounds of butylamine, which has previously been cooled to 0° C. After the addition is complete six hundred pounds of butyraldehyde are rapidly added. The autoclave is closed and the mixture heated to 110° C. for two hours, after which any unreacted volatile constituents are removed under vacuum. This product, when tested in a percentage of 0.375, in a stock containing one hundred parts of smoked sheet, five parts of zinc oxide, and three parts of sulphur, gave a good cure in twenty-five minutes at twenty-five pounds steam pressure. The quantities employed in this example correspond to 4.1 moles of aldehyde, 1 mole of amine and .64 mole of carbon bisulphide.

While I have mentioned for purposes of illustration definite quantities of the reacting components and certain specific temperatures and times of reaction, and in general have given exact conditions under which my improved compounds may be made, I, of course, do not limit myself to these specific proportions or conditions. These illustrative conditions and methods of effecting the interaction and combination of the ingredients may obviously be varied without departing from my invention. In certain cases I may use more than one aldehyde and I may, of course, use other aldehydes than those specified in the examples, also more than one amine or a mixture of aromatic and aliphatic amines may be used. As little as one half a mole of carbon disulphide for each mole of amine may be employed.

In the claims where I specify an amine, I intend to cover, also, the substituted primary amines as the homologues of aniline. Where I specify "rubber" I intend to cover all the botanical varieties of caoutchouc, which include, Hevea, balata, gutta percha, etc., and recognized substitutes therefor.

The vulcanization of the rubber compounds resulting from the employment of the new accelerator products is effected in less than the time normally required and the resulting rubber is of superior quality.

I claim:

1. The product obtained by causing carbon bisulphide to react with a primary aromatic amine to form a dithio carbamate and subsequently causing this reaction product to further react with an aldehyde.

2. The product obtained by causing carbon bisulphide to react with a primary aromatic amine to form an addition product and subsequently causing this product to further react with an aldehyde.

3. The product obtained by causing carbon bisulphide to react with a primary aromatic amine to form an addition product and subsequently causing this product to further react with an aliphatic aldehyde.

4. The product obtained by causing carbon bisulphide to react with a primary aromatic amine to form an addition product and subsequently causing this product to further react with an aliphatic aldehyde containing a plurality of carbon atoms.

5. The product obtained by causing carbon bisulphide to react with a primary aromatic amine to form an addition product and subsequently causing this product to further react with butyraldehyde.

6. The product obtained by causing carbon bisulphide to react with aniline to form an addition product and subsequently causing this product to further react with butyraldehyde.

7. The product set forth in claim 1, in which two to four moles of aldehyde are employed for every mole of amine.

8. The product set forth in claim 1, in which between three and five moles of aldehyde are employed for every mole of amine.

9. The process of producing a compound adapted for use as a rubber vulcanization accelerator, which comprises causing an aldehyde to react on the addition product of a primary aromatic amine and carbon bisulphide.

10. The process of producing a compound adapted for use as a rubber vulcanization accelerator, which comprises causing an aldehyde to react on the addition product of a primary aromatic amine and carbon bisulphide.

11. The process of producing a compound adapted for use as a rubber vulcanization accelerator, which comprises causing an aliphatic aldehyde to react on the addition product of a primary aromatic amine and carbon bisulphide.

12. The process of producing a compound adapted for use as a rubber vulcanization accelerator, which comprises causing an aliphatic aldehyde containing a plurality of carbon atoms to react on the addition product of a primary aromatic amine and carbon bisulphide.

13. The process of producing a compound adapted for use as a rubber vulcanization accelerator, which comprises causing butyraldehyde to react on the addition product of a primary aromatic amine and carbon bisulphide.

14. The process of producing a compound adapted for use as a rubber vulcanization accelerator, which comprises causing butyraldehyde to react on the addition product of aniline and carbon bisulphide.

15. The process set forth in claim 9 wherein two to four moles of aldehyde are employed for every mole of amine.

16. The process set forth in claim 9 wherein between three and five moles of aldehyde are employed for every mole of amine.

17. The process of producing a compound adapted for use as a rubber vulcanization accelerator, which comprises causing two to four moles of butyraldehyde to react on the addition product of a mole of aniline and carbon bisulphide.

18. The product set forth in claim 5 in the production of which two to four moles of aldehyde are employed.

In testimony whereof I affix my signature.

DONALD H. POWERS.